Sept. 29, 1942. H. H. WADE Re. 22,191

GRAVITY SEPARATION OF ORES

Original Filed March 31, 1938 2 Sheets-Sheet 1

Inventor
Henry H. Wade
By Whyte & Whyte
Attorneys

Sept. 29, 1942. H. H. WADE Re. 22,191

GRAVITY SEPARATION OF ORES

Original Filed March 31, 1938 2 Sheets-Sheet 2

Inventor
Henry H. Wade
By Stephen & Stephen
Attorneys

Reissued Sept. 29, 1942 Re. 22,191

UNITED STATES PATENT OFFICE 22,191

GRAVITY SEPARATION OF ORES

Henry H. Wade, Hopkins, Minn., assignor, by mesne assignments, to Minerals Beneficiation, Incorporated, a corporation of Delaware Original No. 2,206,980, dated July 9, 1940, Serial No. 199,197, March 31, 1938. Application for reissue June 25, 1941, Serial No. 399,716

13 Claims. (Cl. 209—39)

This invention relates to the gravity separation of the heavier ores from their impurities or tailings in a fluid mass consisting of liquid, preferably water, and solids insoluble in the liquid and of such character and fineness that by slight agitation of the mixture a uniform mass having a specific gravity within the range of 2.5 to 3.3 may be maintained.

Heretofore, the solid, insoluble constituents of the flotation mediums used in methods for concentrating ores, such as iron, manganiferous iron, copper, lead and zinc ores, by gravity, have not been satisfactory because of the difficulty of separating the mediums from the ore concentrate and the resulting contamination of the concentrates by the introduction of objectionable impurities such as lead and sulphur or compounds of either or both of these objectionable constituents of the medium. The crude ores referred to have such a high specific gravity that in order to float the rock, sand and other tailings in a body of fluid medium the medium must have a specific gravity in some cases in excess of 2.5 and in order to obtain a fluid mass of the required density and at the same time provide the necessary fluidity it is essential that the solid constituent of the medium have a specific gravity in excess of 6.

By the present invention crude ores having a specific gravity in excess of 2.5 may be concentrated in a novel fluid mass containing comminuted solids of magnetic susceptibility which solids are then separated from the ore concentrates and tailings by magnetic attraction.

The invention further provides a continuous novel process for maintaining a predetermined specific gravity in such a flotation medium and repeatedly utilizing substantially all of the solid constituents of the medium while separating the medium from both the tailings and concentrates and delivering the latter substantially free of the medium.

As the preferred solid constituent of the medium, I employ ferro-silicon, reduced to minus 65 to 100 mesh, and containing in excess of 75% by weight of iron. For the concentration of certain iron ores, a ferro-silicon containing about 82% iron, 13% to 14% silicon and a small amount of carbon has been used successfully. Such ferro-silicon is preferably ground to minus 100 mesh and a medium is formed therefrom by mixing the fine ferro-silicon with about 25% of its weight of water. Such ferro-silicon is highly rust resistant, is recoverable from the tailings and concentrates by magnetic attraction and has the further advantage of being so hard that it may be used repeatedly without deterioration. It has a hardness of about 7, Moh's scale, and its specific gravity is about 7.5. As a substitute for the ferro-silicon, high carbon steel may be used having an iron constituent in excess of 75% by weight. High carbon steel in finely divided form makes a good medium but normally is not so rust resistant as ferro-silicon and hence is subject to higher losses due to oxidation in the liquid medium.

My preferred procedure for utilizing such metallic mediums in the concentration of ores will be best understood by reference to the accompanying drawings in which.

Figure 1:
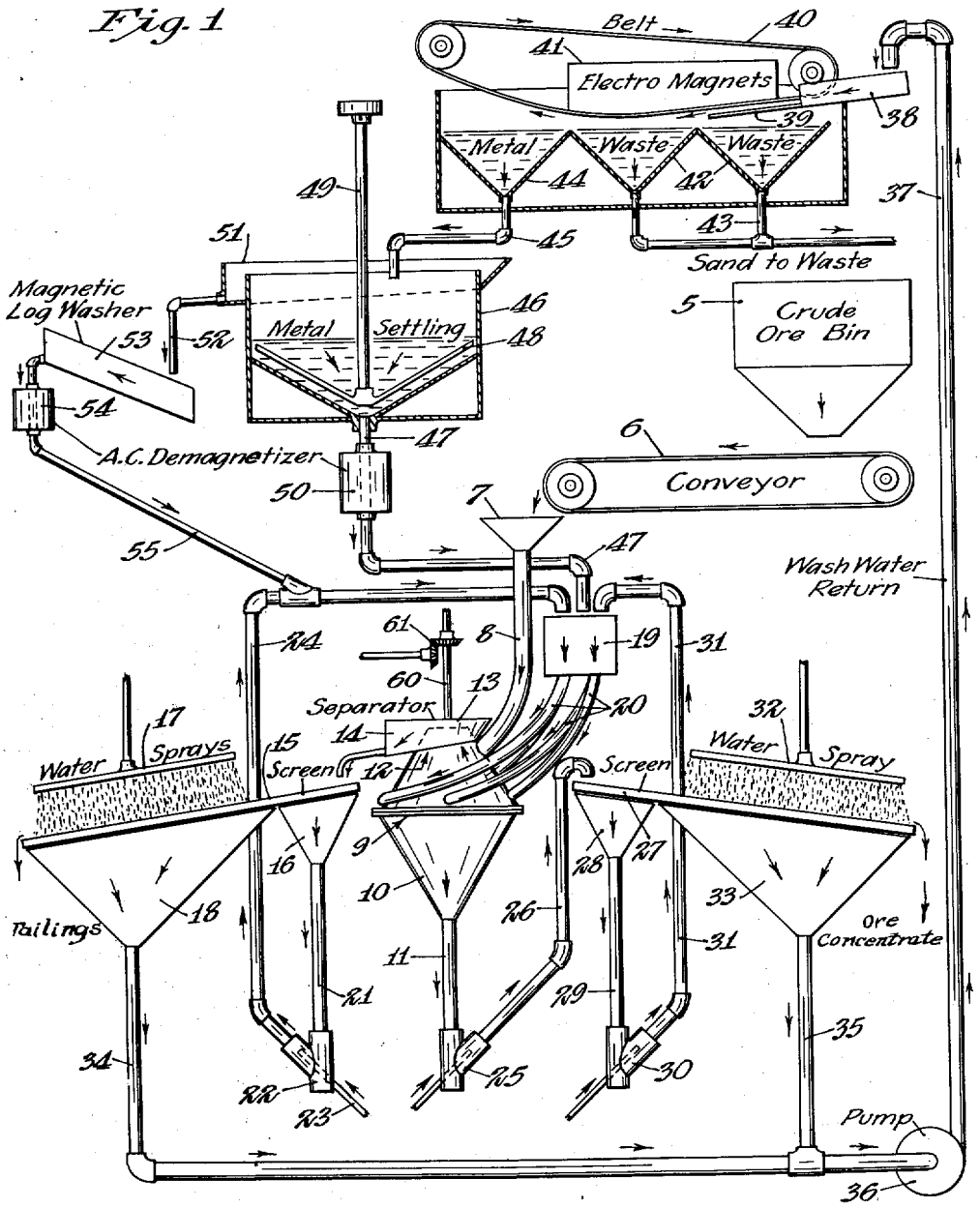
Figure 1 is a diagrammatic illustration of suitable apparatus and connections for carrying out the process.

Referring to Fig. 1, the numeral 5 indicates a bin or hopper for the crude ore which in the case of iron ore is preferably reduced to about one inch mesh and is continuously fed from the hopper to a conveyor 6, operating continuously, to deliver a stream of the ore into a funnel-like receptacle 7. From this receptacle the ore passes by gravity through a pipe 8 into the upper part of a concentrating tank indicated generally by the numeral 9. The lower portion 10 of this tank has the form of an inverted cone and has a central opening in its bottom to deliver the settled ore concentrate into a pipe 11. The upper portion 12 of tank 9 is also conical but converges upwardly to a restricted top opening, its upper periphery 13 extending horizontally to deliver the floated tailings and a portion of the fluid medium into an annular launder 14. This launder delivers the overflow to the upper end of an inclined screen 15, preferably of the punch plate type having a multiplicity of openings about two millimeters in diameter. The tailings are retained on the screen while the bulk of the liquid and solid constituents of the medium pass through it into a catch basin 16 mounted beneath the screen near its upper end. The tailings with adhering particles of medium and of fine tailings, continue down the screen 15. Suitable means for jigging the screen 15 may be provided to augment the gravitational movement of the tailings down along this screen, in accordance with the common practice in this art. While in motion down the lower portion of the screen, the tailings are subjected to water sprays issuing from the pipes 17. This spray washes off the adhering particles of medium and fine tailings into a catch basin 18 and the washed tailings are discharged from the lower end of the screen 15.

A liquid flotation medium, preferably consisting of 80% by weight of finely divided ferro-silicon and about 20% by weight of water is delivered into a head box 19 and thence passes through a series of supply pipes 20 communicating with the tank 9 at a number of points uniformly distributed around the periphery of the tank and at a substantial distance below the upper periphery 13 thereof. This medium, which has a specific gravity of about 3, fills the tank 9 and is continuously supplied in sufficient volume and at such velocity as to maintain the solid constituent thereof in suspension. A portion of the medium overflows the periphery 13 of the tank 9 and carries with it the tailings consisting largely of rock and sand. Medium also flows down through the lower portion 10 of the concentrating tank and out through the pipe 11 with the ore concentrates which have settled out due to their higher specific gravity than either the medium or tailings. The greater part of the overflow fluid medium passes through the screen 15 into the basin 16 from which it is delivered into a pipe 21 arranged to supply an air lift 22. Air under pressure is injected into the lift 22 through a pipe 23 and carries the liquid medium up through a pipe 24 which returns the medium to the head box 19.

The concentrates and some medium are discharged from the bottom of the tank 9 through the pipe 11 and are carried by an air lift 25 and pipe 26 to the upper end of a screen 27. This screen is like the screen 15 and carries the ore concentrate in a thin layer or stream to the lower end of the screen from which the ore falls into a suitable receptacle or pile. The bulk of the medium, after flowing from the pipe 26, passes through the screen into a basin 28 and thence through a pipe 29, air lift 30 and pipe 31 back into the head box 19. As the ore concentrate passes down the screen 27, it is subjected to a water spray from pipes 32, which spray removes the adhering particles of medium and fines from the concentrates and washes them into a basin 33 extending beneath the screen.

The wash water, carrying the tailing fines, some ferro-silicon and concentrate fines is discharged from the basins 18 and 33 into pipes 34 and 35 respectively extending to a suitable pump 36. This pump discharges the fluid mixture through a pipe 37 into a receptacle 38 which distributes the liquid and fines in a thin stream over a plate 39. Moving adjacent to the plate 39 is a belt 40 having electro-magnets 41 above it. These magnets are supplied with direct current and the belt is continuously driven in the direction indicated by arrows. The belt 40 moving in the field of the magnets 41, passes closely adjacent to the stream flowing over the plate 39 and picks up, by magnetic attraction, on its bottom surface substantially all of the ferro-silicon while the particles of tailings, being non-magnetic, are not lifted by magnetic attraction, but fall from the end of the plate 39, together with the greater part of the water constituent into waste hoppers 42. From these hoppers the non-magnetic particles and water are discharged through pipes 43. The belt 40 carries the adhering particles of ferro-silicon to a point somewhat beyond the influence of the electro-magnets 41 at which point such particles are released from the belt and fall into a hopper 44, in which the water is largely free from waste products. From this hopper the medium passes through a pipe 45 into a settling tank 46 containing water in a sufficiently quiescent state to permit the metallic solids to settle to the bottom. As these solids remain in their polarized condition, the smaller particles adhere to the larger ones and the settling is accelerated due to the resulting adherence of the particles to each other, until the subsequent demagnetizing treatment. The solids are thus concentrated in the water in tank 46 to secure a medium of the required specific gravity and the medium is then removed from the bottom of the tank 46 by an outlet pipe 47. During removal of the medium from the tank 46, rake arms 48 are slowly rotated by power applied to a supporting shaft 49. The pipe 47 carries the concentrated medium, having a specific gravity in excess of 2.5 axially through a de-magnetizer 50, which is supplied with alternating current. The residual magnetism of the particles is thus destroyed so that they may be readily diffused in the fluid mass. The pipe 47 then returns the demagnetized concentrated medium to the head box 19.

Water is displaced from the top of the tank 46 and may be collected in a launder 51 together with such small amounts of the magnetic solids as are carried over by the water. This launder discharges through a pipe 52 into a magnetic log washer 53 which separates the magnetic solids from the bulk of the water. The magnetic solids are discharged from this washer through a demagnetizer 54 and are returned to the head box 19 through a pipe 55 and the pipe 24. The use of the magnetic log washer 53 is optional and in some cases it may be practical to merely waste the overflow from the settling tank 46.

Figure 2:
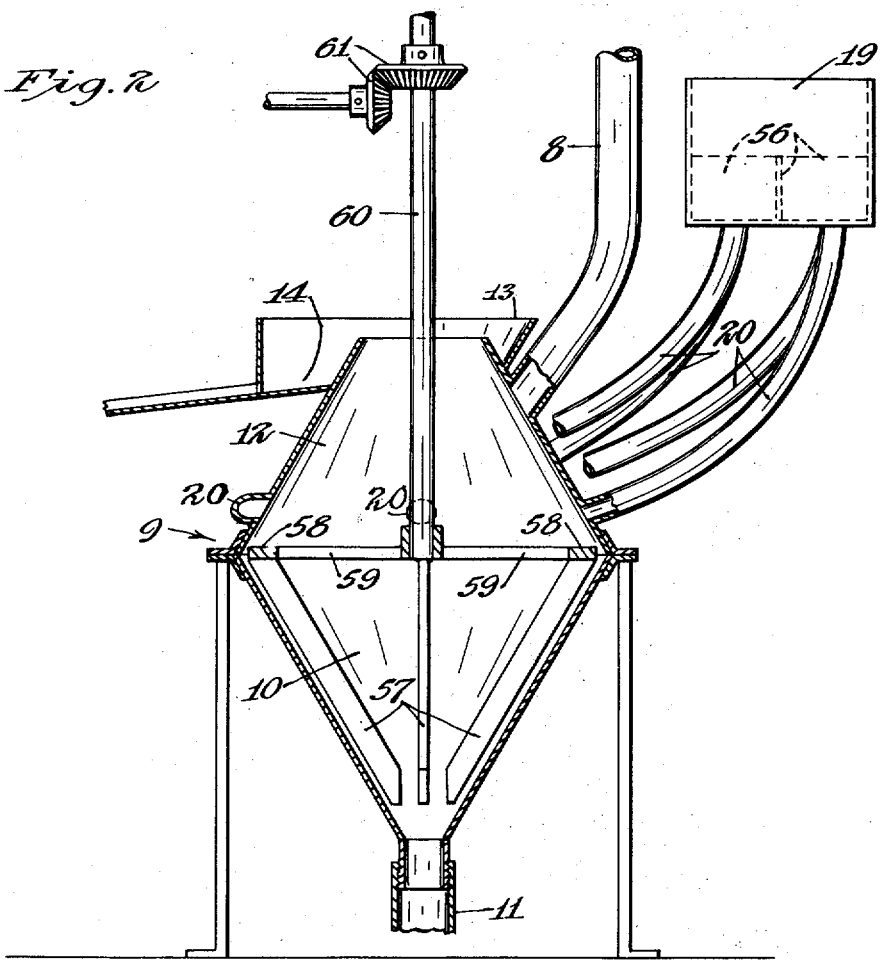
Fig. 2 is a somewhat enlarged central vertical section through the preferred form of concentration tank.
Figure 3:
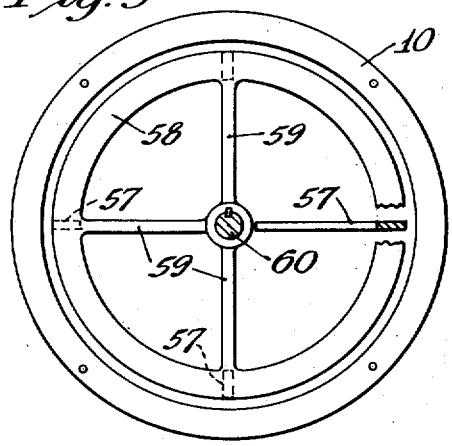
Fig. 3 is a plan view of the lower part of the concentrating chamber.
Figure 4:
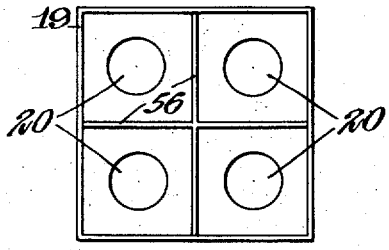
Fig. 4 is a plan view of the head box for distributing the medium to the tank.

As shown in Figs. 2 and 4, the lower portion of the head box 19 is divided by partitions 56 into separate outlet chambers. The upper edges of the partitions 56 extend in a common horizontal plane and the several pipes 20 communicate respectively with several outlet chambers thus formed. The upper surface of the medium in the box 19 is maintained above the upper edges of the partitions 56 so that the several pipes 20 are uniformly supplied with medium.

To prevent the building up of the ore concentrate on the conical walls of the lower portion 10 of the tank 9, rake arms 57 are arranged to extend parallel to elements of the conical surface and are slowly rotated within the tank. The upper ends of the several arms 57 are rigidly secured to a ring 58 and this ring has arms 59 connecting it to a central shaft 60 which projects from the top of the tank 9 and is arranged to be rotated by suitable mechanism, such as the gearing indicated at 61 (Fig. 2).

It is not essential that the crude ore be crushed to about one inch size, as hereinbefore described and crushing to much larger or smaller sizes is frequently desirable although the equipment must be designed to handle the particular size selected. In the recovery of the solid from the wash water it is sometimes desirable to pass the fluid from the pipe 37 through a thickener or dewatering equipment of suitable design before conducting the solids to the receptacle 38. Thickening or dewatering treatment of the overflow from the tank 46 may also be applied to the fluid feed for the magnetic log washer 53.

It will now be evident that the process herein described is a continuous one in which the ore concentrates, substantially free from the flotation medium, are discharged from the screen 27 while the tailings, washed free of the medium, are discharged from the screen 15. The solid constituents of the flotation medium are recovered magnetically and continuously, substantially free of impurities and returned, after being demagnetized, to the gravity separation tank.

The ferro-silicon of the medium, in addition to having a high specific gravity, is highly resistant to rust and is very hard and can be obtained at low cost. These characteristics make it unusually practical for use in concentrating ores of high specific gravity. Further, because of its magnetic character substantially all of it may be recovered so that it has a long, useful life in the process and may be circulated many times through the concentration tank. As a result of these features, the specific gravity of the medium in the concentration tank may be controlled accurately at the predetermined high point required for the concentration of the particular ore to be treated.

The ores which may be concentrated by my improved method require fluid mediums having specific gravities within the limits of about 2.5 to 3.3 and for each ore the gravity of the medium must be controlled within a narrow range. Ferro-silicons for use in forming the medium are available having specific gravities varying from about 6.5 to 7.5, depending on the porosity as well as the chemical composition.

The expression "iron composition" as used in the appended claims, is intended to include ordinary and eutectic mixtures, alloys and compounds of iron and steel where the iron constituent exceeds 75% by weight, of the composition.

In the claims the term "substantially self-sustaining" as applied to a separating medium or liquid or fluid mass is intended to define gravity separating media consisting of liquids such as water and comminuted solids and supplied to a separating tank in such volume and at such velocity as to maintain the solid constituent thereof in suspension.

Having described my invention, what I claim as new and desire to protect by Letters Patent is:

1. The method of concentrating an ore which consists in introducing it into a substantially self-sustaining fluid mass consisting of comminuted particles of an iron composition and a liquid, said composition containing in excess of 75% by weight of iron, continuously floating the lighter constituents of the ore in said mass and allowing the heavier constituents to settle therein, separately removing the heavier and lighter constituents of the ore from said mass, washing the iron composition particles from the separated ore constituents, recovering said composition particles from the wash water by magnetic attraction, whereby said particles become magnetized, then destroying the residual magnetism of the recovered particles and returning said particles to said fluid mass.

2. The method of concentrating an ore which consists in introducing the ore into a fluid mass consisting of ferro-silicon and a liquid, said ferro-silicon containing in excess of 75% by weight of iron, continuously floating the tailings from the ore in said mass and allowing the ore concentrate to settle in said mass, removing the ore concentrates and a portion of said mass from the lower part of said mass, withdrawing the tailings and a portion of said mass from the upper part of said mass, washing the ferro-silicon from the separated ore concentrate and tailings, recovering the ferro-silicon from the wash water by magnetic attraction and returning the ferro-silicon so recovered to said mass.

3. The method of concentrating iron ore and manganiferous iron ore having a specific gravity in excess of 2.5 which consists in delivering the crude ore into a fluid mass consisting of ferro-silicon and water, the ferro-silicon containing approximately 82% by weight of iron and in excess of 10% by weight of silicon, maintaining the specific gravity of said mass at such point as to float the tailings from the ore and to allow the ore concentrate to settle therein and separately removing the ore concentrate and tailings from said mass.

4. The method of concentrating an ore which consists in continuously introducing the ore into a fluid mass of flotation medium consisting of finely divided ferro-silicon and water, continuously floating the tailings from the ore in said medium and allowing the ore concentrate to settle therein, continuously removing the ore concentrate and a portion of said medium from the lower part of said mass, continuously withdrawing the tailings and a portion of said medium from the upper part of said mass, continuously separating the bulk of the withdrawn medium from the tailings and ore concentrate, returning the separated medium to said fluid mass, washing the ferro-silicon from the separated ore and tailings, recovering the ferro-silicon from the wash water by magnetic attraction and returning the ferro-silicon so recovered to said mass.

5. The method of concentrating an ore which consists in delivering the crude ore into a substantially self-sustaining fluid mass consisting of comminuted particles of an iron composition and water, said composition containing in excess of 75% by weight of magnetic iron, maintaining the specific gravity of said mass at such point as to float the tailings from the ore and to allow the ore concentrate to settle therein, separately removing the ore concentrates and tailings from the mass, washing said tailings and ore concentrates to remove adhering particles of said iron composition therefrom, recovering said particles from the wash water by magnetic attraction whereby they become magnetized, then concentrating said particles by utilizing their residual magnetism to accelerate their settling in water, then destroying residual magnetism of said particles and returning them to the fluid mass.

6. A process of concentrating ores which consists in introducing a finely comminuted rust-resistant ferro-silicon of magnetic susceptibility into a liquid to secure a liquid medium having a desired specific gravity, introducing said medium into a container, introducing the ore into said medium, floating ore particles having less specific gravity than that of the medium to the surface of the medium, removing said lighter particles and some medium from the container and recovering said comminuted ferro-silicon from the removed medium by magnetic attraction.

7. In a process for concentrating ore, the steps of introducing the ore into a gravity liquid flotation medium consisting of magnetically attractive rust resistant ferro-silicon and water, the ferro-silicon and water mixed in proportions to form a liquid gravity separating medium having a specific gravity intermediate the specific gravities of the ore particles to be separated, separating the ore constituents in said medium, removing the separated constituents together with some of the medium, and then recovering the ferro-silicon from said separated medium by magnetic attraction.

8. The method of concentrating ores which consists in introducing the ore into a fluid mass of flotation medium consisting of finely divided ferro-silicon and water, continuously removing tailings and concentrates and a portion of said medium from said fluid mass, separating the bulk of the removed medium from the removed tailings and concentrates, returning the separated medium to said fluid mass, washing the ferro-silicon from the separated tailings and cencentrates and recovering the ferro-silicon from the wash water by magnetic attraction.

9. In a process of separating ore particles the steps of introducing the ore particles into a self-sustaining separating medium comprising a liquid containing a comminuted rust resistant, abrasion resistant solid of magnetic susceptibility and wherein some of the ore particles sink and some ore particles float, removing separated ore particles with some of said medium from the main body of medium, separating ore particles from said removed medium, recovering by magnetic attraction comminuted magnetic solid particles from the removed medium, whereby said solid particles are magnetized, destroying the residual magnetism of said magnetized solid particles, and then reusing the said particles in the separating medium.

10. The method of cencentrating an ore having a specific gravity greater than 2.5, which consists in delivering the ore to a separating tank containing a substantially self-sustaining fluid mass in which the heavier ore particles sink and the lighter ore particles float and consisting of approximately 20% by weight of water and a comminuted rust resistant iron composition in which composition the iron constituent exceeds 75% by weight, maintaining the specific gravity of the fluid mass intermediate the specific gravity of the ore particles to be separated, recovering iron composition particles of used medium by magnetic attraction whereby said particles become magnetized, settling said magnetized iron composition particles in a suitable container, then passing the settled magnetized iron composition particles through an alternating current demagnetizer whereby their residual magnetism is destroyed, and then returning said recovered particles together with water to the separating tank.

11. In a continuous process for separating ore constituents employing a liquid separating medium, the steps of subjecting the ore to a body of a substantially self-sustaining liquid separating medium containing a finely divided rust-resistant metal of magnetic susceptibility and wherein some of the ore particles float and some sink, removing the separated ore particles and some medium from the main body of medium, recovering finely divided metal particles of the removed medium by magnetic attraction whereby said comminuted metal particles become magnetized, destroying the residual magnetism of said magnetized metal particles by passing the same through an alternating current demagnetizer, and then returning said demagnetized particles to the separating medium.

12. A process of concentrating ores which consists in introducing a finely comminuted rust-resistant iron alloy having magnetic susceptibility into a liquid to secure a substantially self-sustaining liquid medium having a desired specific gravity, introducing said medium into a container, introducing the ore into said medium, floating ore particles having less specific gravity than that of the medium to the surface of the medium, removing said lighter particles and some medium from the container, recovering by magnetic attraction alloy particles contained in the removed medium whereby said alloy particles become magnetized, destroying the residual magnetism of said removed alloy particles, and then returning the recovered particles to the separating medium while maintaining the self-sustaining character of said medium.

13. In a process of separating ore particles, the steps of introducing the ore particles into a substantially self-sustaining separating medium comprising a liquid containing a comminuted solid of magnetic susceptibility suspended therein, said medium being of such specific gravity that some of the ore particles sink and some ore particles float therein, removing separated ore particles with some of said medium from the main body of medium, separating ore particles from said removed medium, recovering by magnetic attraction comminuted solid particles of magnetic susceptibility contained in the removed medium whereby said solid particles are magnetized, destroying the residual magnetism of said magnetized solid particles and then reincorporating said demagnetized solid particles as a part of the main body of separating medium while maintaining the self-sustaining character of the said medium.

HENRY H. WADE.